(12) United States Patent
Artmann et al.

(10) Patent No.: US 12,489,345 B2
(45) Date of Patent: Dec. 2, 2025

(54) HALL BOARD INSIDE THE END WINDINGS

(71) Applicant: Hilti Aktiengesellschaft, Schaan (LI)

(72) Inventors: Konrad Artmann, Schondorf (DE); Lothar Dietl, Kaufering (DE); Tobias Schmid, Emmenhausen (DE); Helmut Burger, Unterdiessen (DE)

(73) Assignee: Hilti Aktiengesellschaft, Schaan (LI)

( * ) Notice: Subject to any disclaimer, the term of this patent is extended or adjusted under 35 U.S.C. 154(b) by 269 days.

(21) Appl. No.: 17/777,785

(22) PCT Filed: Nov. 19, 2020

(86) PCT No.: PCT/EP2020/082701
§ 371 (c)(1),
(2) Date: May 18, 2022

(87) PCT Pub. No.: WO2021/104990
PCT Pub. Date: Jun. 3, 2021

(65) Prior Publication Data
US 2023/0017431 A1    Jan. 19, 2023

(30) Foreign Application Priority Data
Nov. 29, 2019 (EP) ..................... 19212502

(51) Int. Cl.
*H02K 11/215* (2016.01)
*H02K 1/16* (2006.01)
*H02K 29/08* (2006.01)

(52) U.S. Cl.
CPC ............. *H02K 11/215* (2016.01); *H02K 1/16* (2013.01); *H02K 29/08* (2013.01); *H02K 2211/03* (2013.01)

(58) Field of Classification Search
CPC ........ H02K 1/16; H02K 29/00; H02K 11/215; H02K 2211/03; H02K 3/522
See application file for complete search history.

(56) References Cited

U.S. PATENT DOCUMENTS

| 8,258,659 B2 | 9/2012 | Debrailley et al. |
| 2003/0173924 A1 | 9/2003 | Blase et al. |
| 2010/0133935 A1 | 6/2010 | Kinugawa et al. |
| (Continued) | | |

FOREIGN PATENT DOCUMENTS

| CN | 101026328 A | 5/2007 |
| CN | 205249013 U | 5/2016 |
| (Continued) | | |

OTHER PUBLICATIONS

International Search Report of PCT/EP2020/082701, Jan. 22, 2021.

*Primary Examiner* — Christopher M Koehler
*Assistant Examiner* — Viswanathan Subramanian
(74) *Attorney, Agent, or Firm* — Davidson Kappel LLC

(57) ABSTRACT

An electric motor containing a board holder and an angle measuring unit with at least one Hall sensor for detecting a rotation angle and at least two hooks for receiving and holding a winding wire, wherein the angle measuring unit is designed to commutate the electric motor as a function of the detected rotation angle. The board holder contains a pot-like recess with an end face, wherein the recess and the angle measuring unit are designed such that, in an assembled state, the angle measuring unit bears against the end face of the recess such that the angle measuring unit is positioned before the at least two hooks in an arrow direction.

7 Claims, 5 Drawing Sheets

(56) References Cited

U.S. PATENT DOCUMENTS

| | | |
|---|---|---|
| 2017/0040873 A1 | 2/2017 | Pyeon et al. |
| 2017/0288499 A1 | 10/2017 | Beyerl et al. |
| 2017/0317548 A1 | 11/2017 | Suzuki et al. |
| 2018/0278103 A1 | 9/2018 | Bernreuther |
| 2019/0001452 A1 | 1/2019 | Nagahama et al. |
| 2019/0203825 A1 | 7/2019 | Yamauchi et al. |
| 2019/0288575 A1 | 9/2019 | Tussing et al. |
| 2019/0296603 A1 | 9/2019 | Mahler et al. |
| 2019/0356197 A1 | 11/2019 | Beyerl et al. |

FOREIGN PATENT DOCUMENTS

| | | |
|---|---|---|
| CN | 106451930 A | 2/2017 |
| CN | 108370207 A | 8/2018 |
| CN | 208078854 U | 11/2018 |
| CN | 109070328 A | 12/2018 |
| CN | 109155570 A | 1/2019 |
| CN | 209402349 U | 9/2019 |
| DE | 102016002387 A1 | 10/2016 |
| EP | 3 316454 A1 | 5/2018 |
| JP | 2012029350 A | 2/2012 |
| KR | 101429081 B1 | 8/2014 |
| WO | WO2007104894 A1 | 9/2007 |

HALL BOARD INSIDE THE END WINDINGS

The present invention relates to a stator for an electric motor.

Furthermore, the present invention relates to an electric motor having a stator.

BACKGROUND

Electric motors, in particular brushless electric motors, having a stator and a rotor rotating in the stator are widely known from the prior art. European patent application EP 3 316 454 A1 shows, for example, an electric motor according to the prior art.

An electric motor according to the prior art usually and substantially contains a stator and a rotor rotating relative to the stator. The rotor for an electric motor usually consists of a number of stacked laminations which are arranged one behind the other to form a so-called laminated core. Furthermore, the rotor contains a rotor shaft which is positioned through a central opening of the laminated core. The rotor shaft transmits the torque generated in the electric motor to other components.

In addition to numerous winding supports for a winding wire of the coils, the stator also contains a commutation device for commutating the electric motor. In the case of an electronically commutated electric motor, the commutation device has a number of Hall sensors in order to detect the magnets of the rotating rotor and therefore the rotation angle position of the rotor relative to the stator.

SUMMARY OF THE INVENTION

For good commutation signals in electronically commutated electric motors, the Hall sensors have to be positioned as close as possible to the magnets which are located on the rotor. This is usually associated with increased structural complexity, e.g. separate signal transmitters or excessively long rotors.

It is an object of the present invention to provide a stator for an electric motor and an electric motor having a stator with which the abovementioned problem can be solved and the simplest and most compact design possible can be achieved.

The present invention provides a stator for an electric motor containing a board holder and an angle measuring unit with at least one Hall sensor for detecting a rotation angle and at least two hooks for receiving and holding a winding wire, wherein the angle measuring unit is designed to commutate the electric motor as a function of the detected rotation angle.

According to the invention, it is possible for the board holder to contain a pot-like recess with an end face, wherein the recess and the angle measuring unit are designed such that, in an assembled state, the angle measuring unit bears against the end face of the recess such that the angle measuring unit is positioned before the at least two hooks in an arrow direction.

Furthermore, the present invention provides an electric motor having a stator of the present invention.

Further advantages can be found in the following description of the figures. Various exemplary embodiments of the present invention are illustrated in the figures. The figures, the description and the claims contain numerous features in combination. A person skilled in the art will expediently also consider the features individually and combine them into useful further combinations.

DETAILED DESCRIPTION

Figure 1:
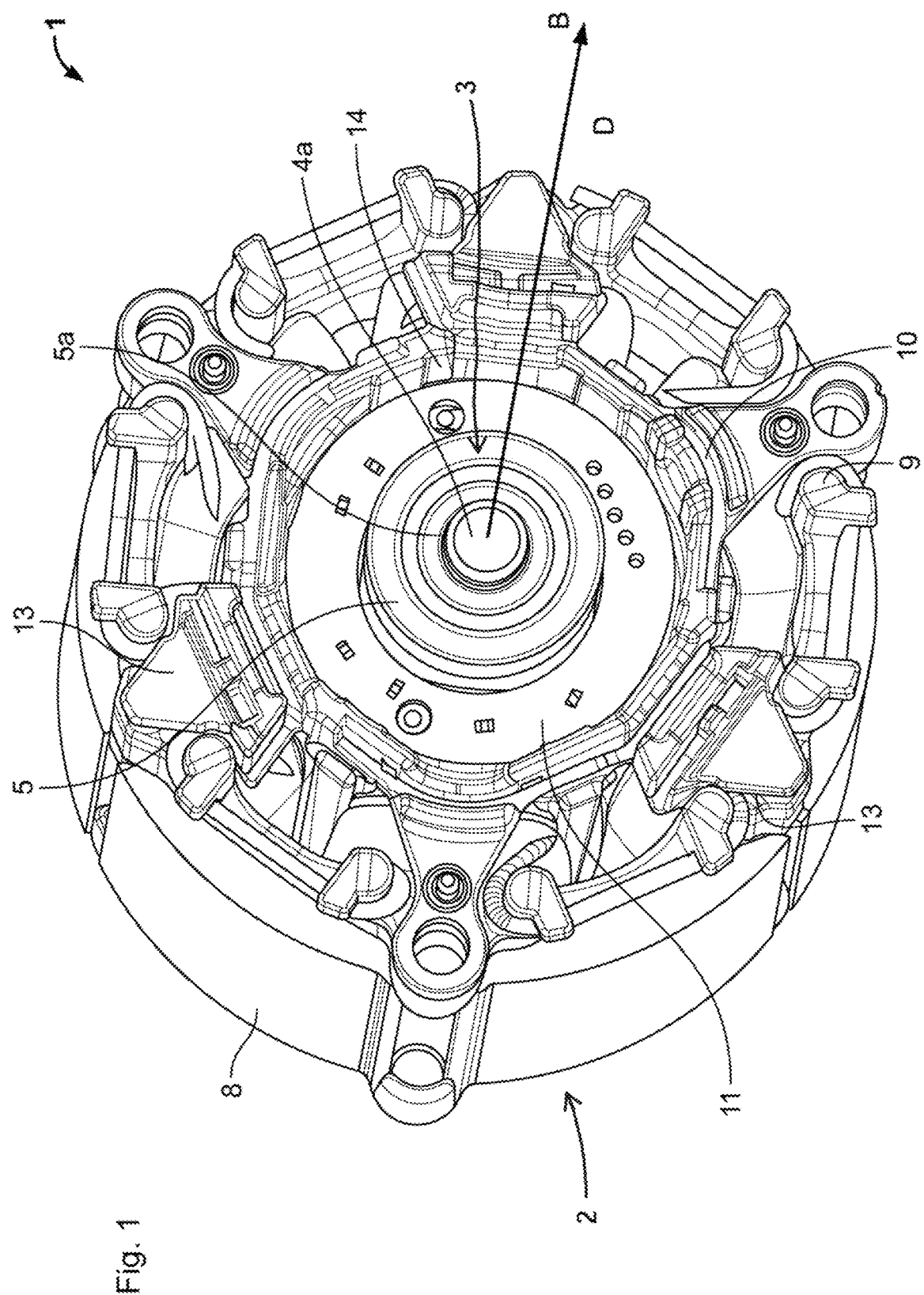
FIG. 1 shows a perspective view of an electric motor having a laminated stator core, a winding support device, an angle measuring unit, a board holder, a laminated rotor core, a rotor shaft and a rotor shaft bearing.

FIG. 1 shows an electric motor 1 according to the invention. The exemplary embodiment shown is a brushless electric motor.

The electric motor 1 can in turn serve as a drive in a power tool. Here, the power tool can be configured as a drilling machine, hammer drill, saw, grinding device or the like.

The electric motor 1 substantially contains a stator 2 and a rotor 3. Here, the rotor 3 is designed and arranged to be rotatable relative to the stator 2. A torque can be generated by means of the rotor 3 rotating relative to the stator 2.

The rotor 3 can be referred to as a rotating member.

Figure 2:
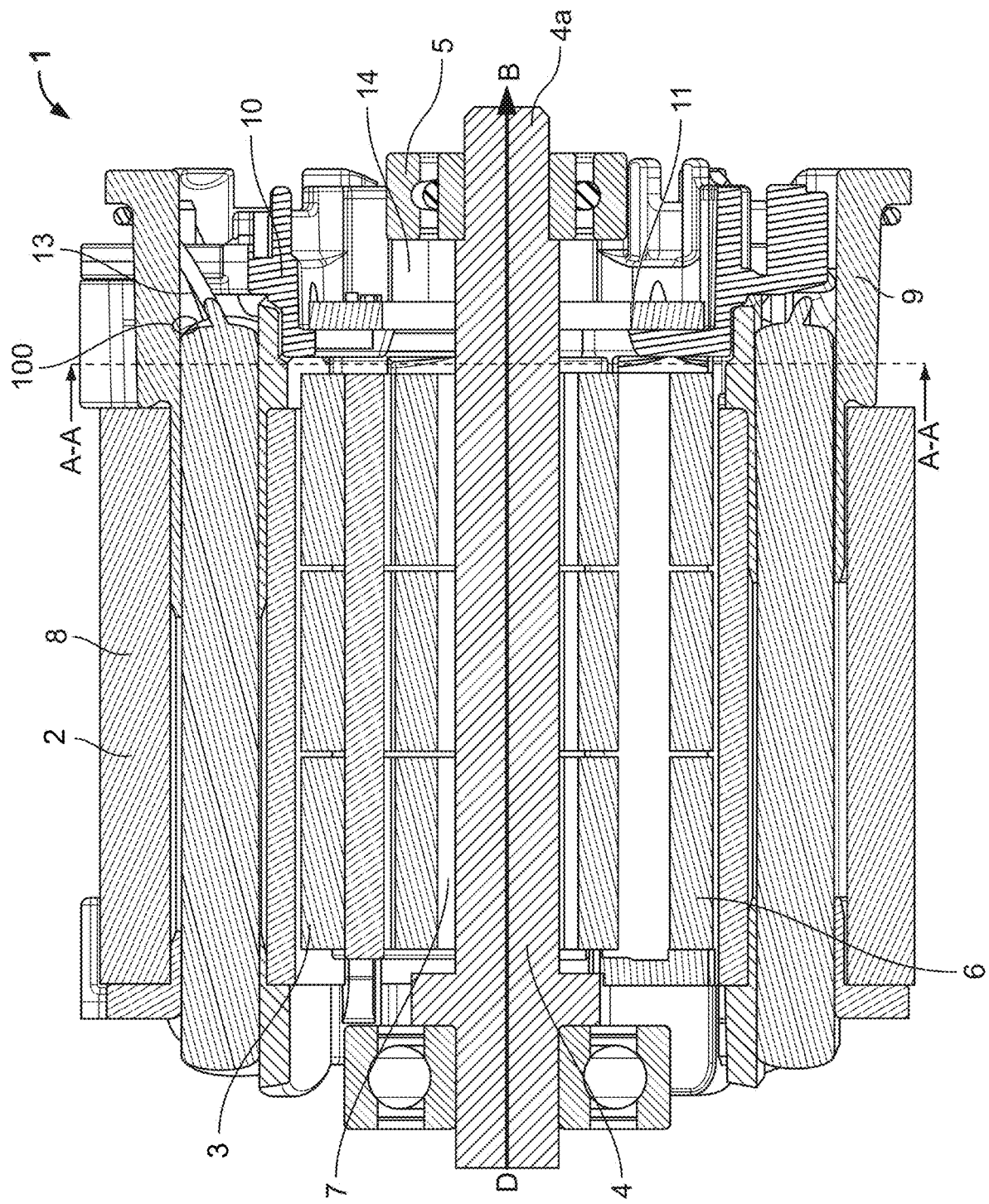
FIG. 2 shows a sectional side view of the electric motor having the laminated stator core, the winding support device, the angle measuring unit, the board holder, the laminated rotor core, the rotor shaft and the rotor shaft bearing.
Figure 3:
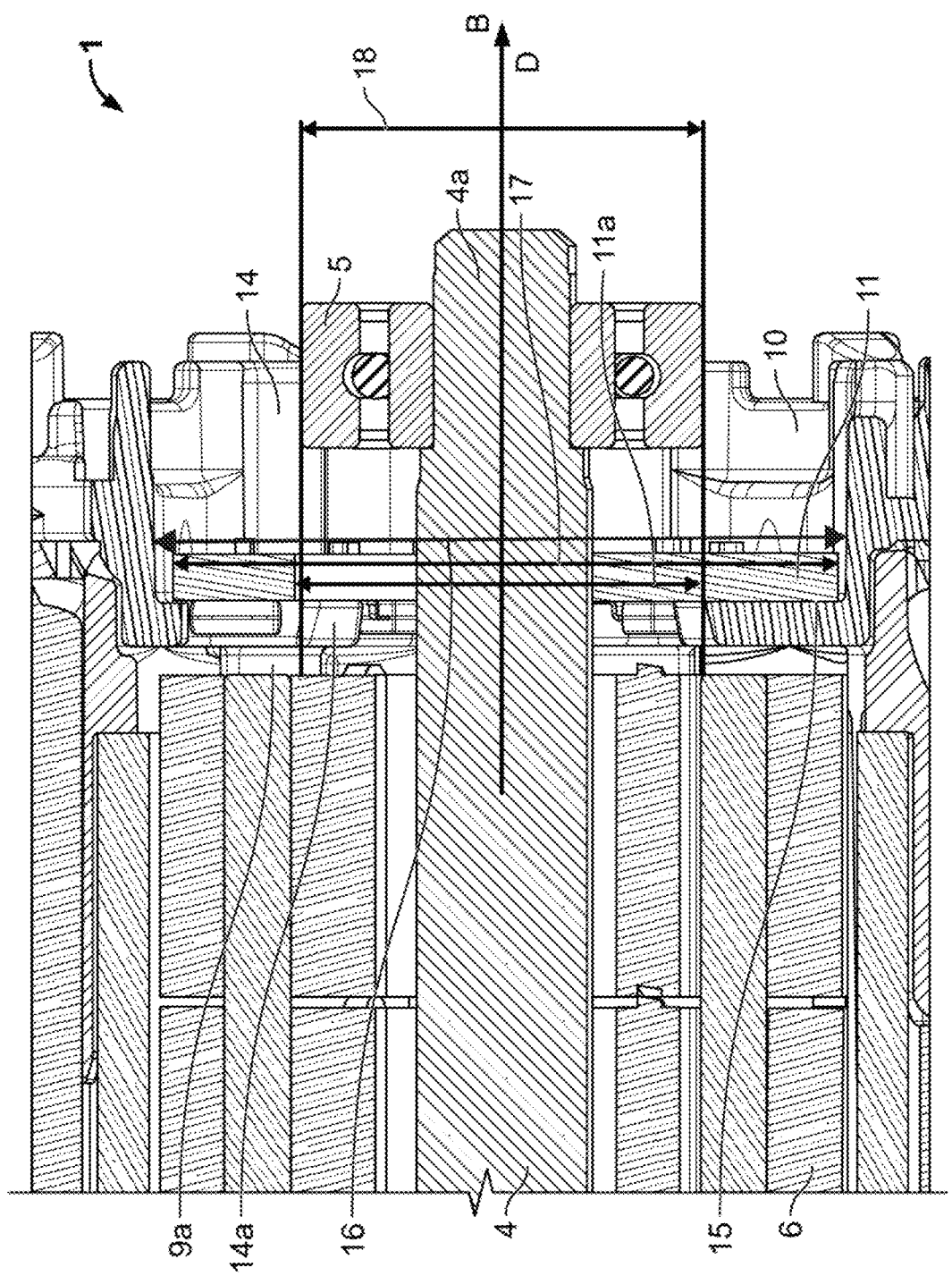
FIG. 3 shows a further sectional view containing more details about the electric motor having the laminated stator core, the winding support device, the angle measuring unit, the board holder, the laminated rotor core, the rotor shaft and the rotor shaft bearing.
Figure 4:
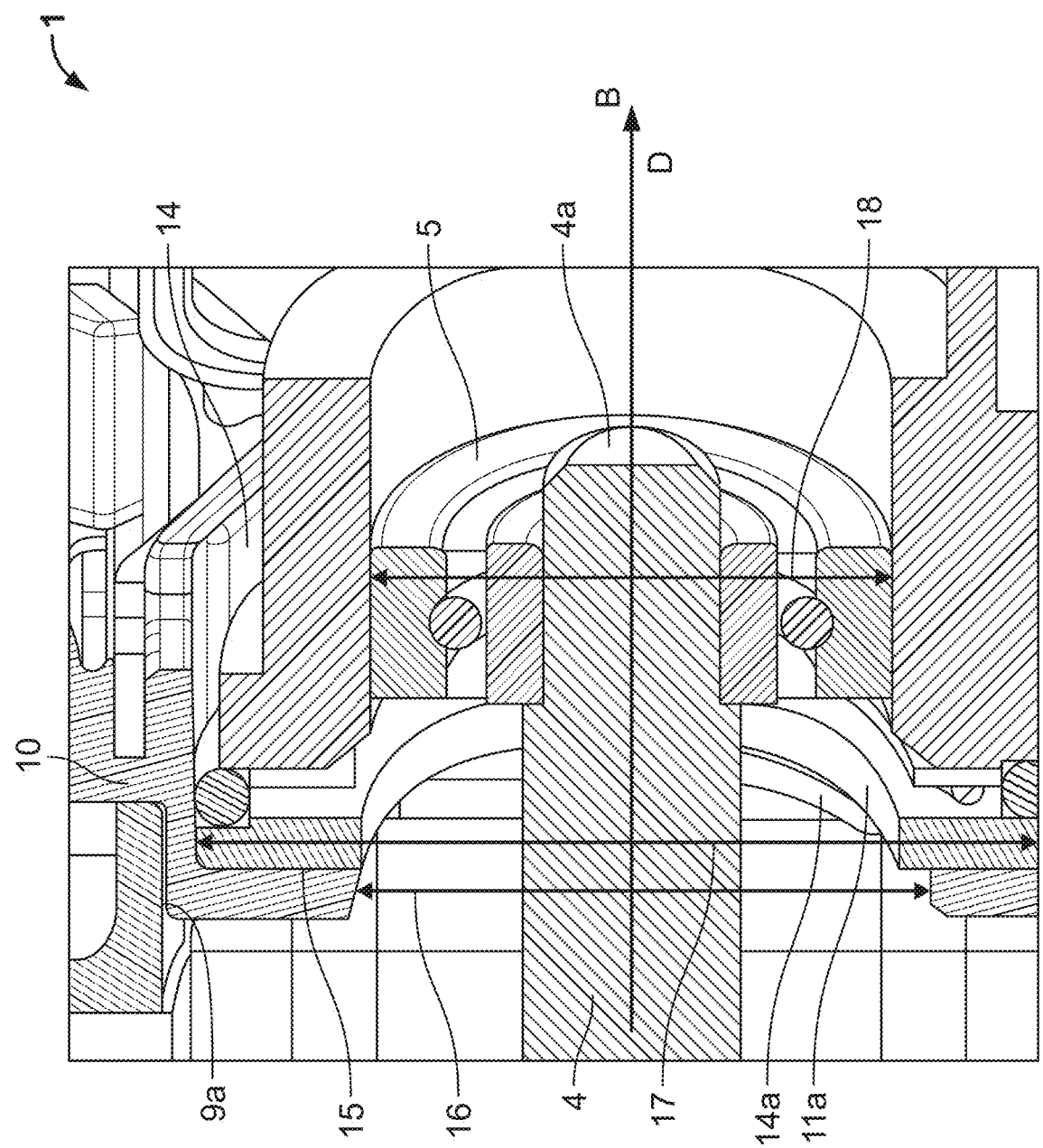
FIG. 4 shows a perspective sectional view containing further details about the board holder, the angle measuring unit, the rotor shaft and the rotor shaft bearing.

The rotor 3 in turn substantially contains a rotor shaft 4 and a rotor shaft bearing 5 (see FIG. 2). As indicated in FIGS. 3 and 4, the rotor 3 contains a laminated rotor core 6 (also simply called a laminated core). Here, the laminated rotor core 6 comprises a plurality of stacked laminations lined up one behind the other to form the cylindrical laminated rotor core 6. The laminated rotor core 6 furthermore contains a central through-hole 7 into which the rotor shaft 4 is inserted. The rotor shaft 4 and the laminated rotor core 6 are fixedly connected to one another. The rotor shaft bearing 5 is circular designed and serves to support the rotor shaft 4. For this purpose, the rotor shaft 4 is positioned by way of one end 4a into the central opening 5a of the rotor shaft bearing 5 (see FIG. 1).

The stator 2 substantially contains a laminated stator core 8 (also simply called a laminated core), a winding support device 9 and a board holder 10 for an angle measuring unit 11, see in particular FIGS. 1 and 2.

As can be seen in the figures, the angle measuring unit 11 is configured substantially as an annular board with a circular cutout 11a. The configuration of the angle measuring unit 11 can also be referred to as a flat cylinder. The board can also be referred to as a printed circuit board, a circuit board or a printed circuit. Furthermore, the printed circuit board can also be referred to as a PCB.

Figure 5:
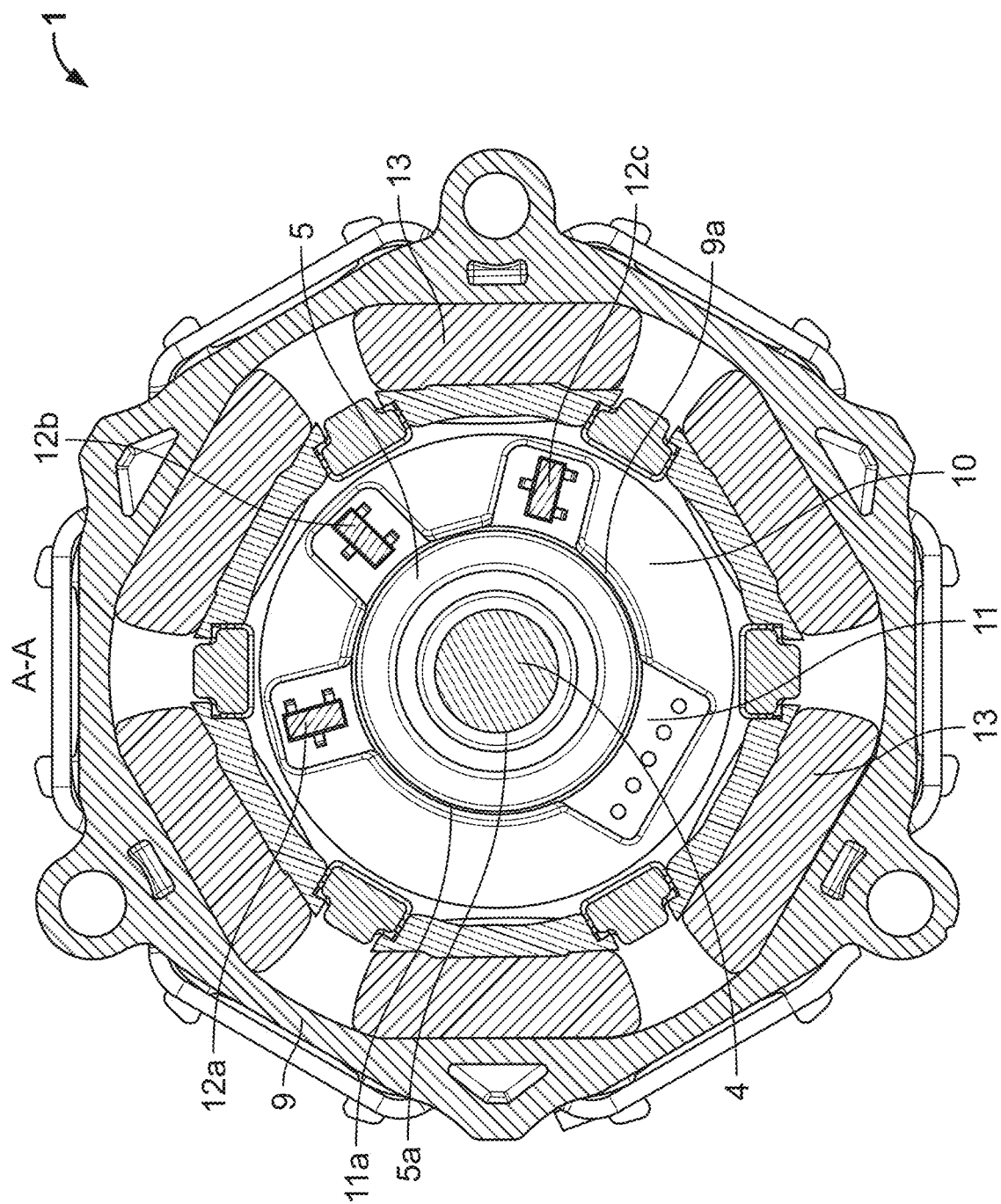
FIG. 5 shows a sectional view along the sectional plane A-A in FIG. 2 of the electric motor having the laminated stator core, the winding support device, the angle measuring unit, the board holder, the rotor shaft and the rotor shaft bearing.

The angle measuring unit 11 furthermore contains a first, second and third Hall sensors 12a, 12b, 12c for detecting the magnets that are fixedly connected to the rotor 3. A rotation angle of the rotor 3 relative to the stator 2 can be detected in this way. The angle measuring unit 11 is designed to commutate the electric motor 1 as a function of the detected rotation angle. In the exemplary embodiment which is illustrated in the figures, the angle measuring unit 11 contains three Hall sensors 12a, 12b, 12c, cf. FIG. 5. However, according to an alternative embodiment of the present invention, it is also possible for said angle measuring unit to contain more or fewer than three Hall sensors.

The winding support device 9 is designed in a substantially annular manner and contains a central circular cutout 9a. Furthermore, the winding support device 9 contains a number of hooks 13 which serve to receive and hold a winding wire. Stator coils are formed around the stator pole teeth by means of the winding wire. The winding wire is shown in FIG. 2 solely schematically as 100.

In the exemplary embodiment which is illustrated in the figures, the stator 2 contains six stator pole teeth and consequently the winding support device correspondingly contains six hooks 13.

The board holder 10 is designed in a substantially annular manner with a pot-like recess 14. The pot-like recess 14 has an end face 15 and a circular cutout 14a. The end face 15 is indicated in FIGS. 2 to 4.

The pot-like recess 14 of the board holder 10 has an inner diameter 16 which corresponds substantially to the outer diameter 17 of the angle measuring unit 11. However, the inner diameter 16 of the pot-like recess 14 is somewhat greater than the outer diameter 17 of the angle measuring unit 11 here, so that the angle measuring unit 11 can be inserted into the pot-like recess 14 opposite arrow direction B and held in the pot-like recess 14. In an assembled state, the end side face of the angle measuring unit 11 bears against the end face 15 of the board holder 10. Care should be taken that, in the assembled state, the angle measuring unit 11 is positioned or arranged before the hook 13 in arrow direction B.

As shown in the figures, the rotor 3 is inserted into the inner receiving volume of the stator 2 in an assembled state. Here, the rotor 3 rotating relative to the stator 2 about the rotation axis D is positioned in relation to the stator 2 such that the magnets of the rotor 3 are arranged as close as possible to the angle measuring unit 11. The shorter the distance in arrow direction B between the magnets of the rotor 3 and the Hall sensors 12a, 12b, 12c of the angle measuring unit 11, the better the detection of the rotation angle position of the magnets by the Hall sensors 12a, 12b, 12c.

The circular outside diameter 18 of the rotor shaft bearing 5, the circular diameter of the cutout 9a of the winding support device 9, the circular diameter of the cutout 14a of the board holder 10 and the circular diameter of the cutout 11a of the angle measuring unit 11 are of substantially the same size.

However, care should be taken that the outside diameter 18 of the rotor shaft bearing 5 is always somewhat smaller than that of the circular diameter of the cutout 9a of the winding support device 9, the circular diameter of the cutout 14a of the board holder 10 and the circular diameter of the cutout 11a of the angle measuring unit 11, so that the rotor shaft bearing 5 can be guided through the cutout 9a of the winding support device 9, through the cutout 14a of the board holder 10 and through the cutout 11a of the angle measuring unit 11.

For the purpose of actually assembling the electric motor 1, the rotor 3 with the rotor shaft 4 and the rotor shaft bearing 5 is joined to the stator 2. For this purpose, the rotor 3 with the rotor shaft 4 and the rotor shaft bearing 5 is pushed into the inner receiving volume of the stator 2 in arrow direction B and positioned there.

On account of the outside diameter 18 of the rotor shaft bearing 5 being somewhat smaller than the diameter of the cutout 9a of the winding support device 9, the diameter of the cutout 14a of the board holder 10 and the diameter of the cutout 11a of the angle measuring unit 11, the rotor shaft bearing 5 can be guided through the cutouts 9a, 14a, 11a in arrow direction B.

As a result, the rotor 3, together with the rotor shaft bearing 5 and the rotor shaft 4, can be pushed into the stator 2 in a single direction B in a simple and time-saving manner and in this way the rotor 3 can be connected to the stator 2.

LIST OF REFERENCE SYMBOLS

1 Electric motor
2 Rotor
3 Stator
4 Rotor shaft
4a End of the rotor shaft
5 Rotor shaft bearing
5a Central opening of the rotor shaft bearing
6 Laminated rotor core
7 Central through-hole of the laminated rotor core
8 Laminated stator core
9 Winding support device
9a Cutout of the winding support device
10 Board holder
11 Angle measuring unit
11a Cutout of the angle measuring unit
12a First Hall sensor
12b Second Hall sensor
12c Third Hall sensor
13 Hook of the winding support device
14 Pot-like recess of the board holder
14a Cutout of the board holder
15 End face of the board holder
16 Inner diameter of the pot-like recess of the board holder
17 Outer diameter of the angle measuring unit
18 Outside diameter of the rotor shaft bearing
100 winding wire

What is claimed is:

1. An electric motor comprising:
a stator including:
a board holder;
an angle measuring unit with at least one Hall sensor for detecting a rotation angle; and
at least two hooks for receiving and holding a winding wire, wherein the angle measuring unit is designed to commutate the electric motor as a function of the detected rotation angle,
the board holder having a pot-shape recess with an end face, wherein the recess and the angle measuring unit are designed such that, in an assembled state, the angle measuring unit bears against the end face such that the end face contacting the angle measuring unit is positioned before the at least two hooks in a longitudinal direction; and
a rotor having a rotor core inside the stator, wherein the pot-shaped recess is defined by an outer axially extending ring and a bottom of the board holder, the bottom having the end face, the end face facing away from the rotor, the bottom having an opposing face facing the rotor, the opposing face being positioned before the at least two hooks in the longitudinal direction.

2. The motor as recited in claim 1 wherein the end face faces in the longitudinal direction so the recess is accessible from an outside of the stator without removing the board holder.

3. The motor as recited in claim 1 wherein the rotor has a rotor shaft fixed to the rotor core, the rotor shaft extending into the pot-shaped recess.

4. The motor as recited in claim 3 wherein the rotor has a rotor shaft bearing, the rotor shaft bearing being in front of the end face in the longitudinal direction.

5. The motor as recited in claim 4 wherein the rotor shaft bearing is located at least partly within the pot-shaped recess.

6. The motor as recited in claim 3 wherein the pot-shaped recess has a circular cutout, the rotor shaft extending through the circular cutout.

7. The motor as recited in claim 1 wherein the rotor has a rotor shaft and a rotor shaft bearing, the bottom having a circular cutout having a diameter larger than a circular outside diameter of the rotor shaft bearing so that the rotor shaft bearing can be guided through the circular cutout.

\* \* \* \* \*